(12) United States Patent
Bae et al.

(10) Patent No.: US 11,128,683 B2
(45) Date of Patent: Sep. 21, 2021

(54) DEVICE AND METHOD FOR TRANSMITTING OR RECEIVING MEDIA RESOURCE IDENTIFICATION INFORMATION IN COMMUNICATION SYSTEM

(71) Applicant: Samsung Electronics Co., Ltd., Suwon-si (KR)

(72) Inventors: Jae-Hyeon Bae, Seoul (KR); Kyung-Mo Park, Seoul (KR); Young-Wan So, Gunpo-si (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 15/764,651

(22) PCT Filed: Sep. 30, 2016

(86) PCT No.: PCT/KR2016/011019
§ 371 (c)(1),
(2) Date: Mar. 29, 2018

(87) PCT Pub. No.: WO2017/057975
PCT Pub. Date: Apr. 6, 2017

(65) Prior Publication Data
US 2018/0288118 A1    Oct. 4, 2018

(30) Foreign Application Priority Data

Oct. 1, 2015  (KR) ........................ 10-2015-0138822

(51) Int. Cl.
*H04L 29/06* (2006.01)
*H04W 4/06* (2009.01)
(Continued)

(52) U.S. Cl.
CPC ......... *H04L 65/4076* (2013.01); *H04H 60/06* (2013.01); *H04W 4/06* (2013.01);
(Continued)

(58) Field of Classification Search
CPC .... H04H 60/06; H04L 65/4076; H04W 16/04
See application file for complete search history.

(56) References Cited

U.S. PATENT DOCUMENTS 8,332,527 B2 * 12/2012 Yan .................. H04L 65/1016
709/231
2007/0036102 A1 * 2/2007 Hwang ................. H04H 20/93
370/328

(Continued)

FOREIGN PATENT DOCUMENTS

| CN | 101682570 A | 3/2010 |
| CN | 101742244 A | 6/2010 |

(Continued)

OTHER PUBLICATIONS

European Office Action dated Jun. 13, 2019, issued in European Patent Application No. 16852121.9.

(Continued)

*Primary Examiner* — Ranodhi Serrao
(74) *Attorney, Agent, or Firm* — Jefferson IP Law, LLP (57) ABSTRACT

The present invention relates to a device and method for transmitting or receiving media resource identification (MRI) information for managing traffic of a service in a communication system. A method for transmitting information associated with content provision in a communication system according to an embodiment of the present invention comprises the steps of: acquiring content configuration information and transmission scheme information for a content; generating media resource identification information including scheduling information and the transmission (Continued)

scheme information according to each content type on the basis of the content configuration information and the transmission scheme information; and transmitting the media resource identification information.

16 Claims, 6 Drawing Sheets

(51) Int. Cl.
    *H04W 16/04*     (2009.01)
    *H04W 28/08*     (2009.01)
    *H04W 28/02*     (2009.01)
    *H04H 60/06*     (2008.01)

(52) U.S. Cl.
    CPC ........... *H04W 16/04* (2013.01); *H04W 28/02* (2013.01); *H04W 28/0252* (2013.01); *H04W 28/08* (2013.01); *H04W 28/085* (2013.01)

(56) References Cited

U.S. PATENT DOCUMENTS

| | | | |
|---|---|---|---|
| 2007/0041377 A1* | 2/2007 | Song | H04L 12/1877 370/389 |
| 2008/0307108 A1* | 12/2008 | Yan | H04L 65/4084 709/231 |
| 2009/0046617 A1 | 2/2009 | Tenny et al. | |
| 2009/0069003 A1* | 3/2009 | Kim | H04W 28/06 455/422.1 |
| 2009/0100147 A1* | 4/2009 | Igarashi | H04N 21/6408 709/218 |
| 2009/0158330 A1* | 6/2009 | Song | H04N 21/4345 725/39 |
| 2009/0180484 A1* | 7/2009 | Igarashi | H04N 7/17309 370/401 |
| 2009/0193469 A1* | 7/2009 | Igarashi | H04N 21/64322 725/56 |
| 2009/0235317 A1* | 9/2009 | Igarashi | H04N 21/6408 725/82 |
| 2009/0257729 A1* | 10/2009 | Ahn | H04N 7/17318 386/239 |
| 2010/0165902 A1 | 7/2010 | Kvernvik et al. | |
| 2011/0173665 A1 | 7/2011 | Shim et al. | |
| 2013/0007814 A1 | 1/2013 | Cherian et al. | |
| 2013/0111520 A1 | 5/2013 | Lo et al. | |
| 2013/0182643 A1 | 7/2013 | Pazos et al. | |
| 2014/0325580 A1 | 10/2014 | Lohmar et al. | |
| 2014/0342700 A1 | 11/2014 | Srinivasan et al. | |
| 2015/0089560 A1* | 3/2015 | Park | H04L 65/607 725/116 |
| 2015/0092688 A1 | 4/2015 | Jeong et al. | |
| 2016/0065381 A1* | 3/2016 | Yoon | H04L 12/189 370/312 |

FOREIGN PATENT DOCUMENTS

| | | |
|---|---|---|
| CN | 104012125 A | 8/2014 |
| KR | 10-2010-0034285 A | 4/2010 |
| KR | 10-2013-0103446 A | 9/2013 |
| KR | 10-2014-0030329 A | 3/2014 |
| KR | 10-2014-0114035 A | 9/2014 |

OTHER PUBLICATIONS

Chinese Office Action with English translation dated Aug. 5, 2020; Chinese Appln. No. 201680057619.3.

* cited by examiner

DEVICE AND METHOD FOR TRANSMITTING OR RECEIVING MEDIA RESOURCE IDENTIFICATION INFORMATION IN COMMUNICATION SYSTEM

CROSS-REFERENCE TO RELATED APPLICATION(S)

This application is a U.S. National Stage application under 35 U.S.C. § 371 of an International application number PCT/KR2016/011019, filed on Sep. 30, 2016, which is based on and claimed the benefit priority of a Korean patent application number 10-2015-0138822, filed on Oct. 1, 2015, in the Korean Intellectual Property Office, the disclosure of which is hereby incorporated by reference herein in its entirety.

TECHNICAL FIELD

The present disclosure relates to an apparatus and method for transmitting and receiving media resource identification (MRI) information for managing traffic of a service in a communication system.

BACKGROUND ART

According to explosive growth of a wired and wireless internet, various types of internet televisions (TVs) will be a meaningful part of everyday life in the future. It is expected that 80% of mobile data traffic will occur in smart phones by 2020, and mobile video traffic will account for about 60% of total mobile data traffic according to rapid increase of mobile data traffic.

Actually, a Korea and Russia World Cup game on Jun. 18, 2014 may be an example which shows the power of mobile broadcasting well. A game progressed during the work hours, so users of a high-definition live broadcasting service provided by NAVER© and DAUM© gathered and mobile data traffic also increased significantly. Therefore, a problem that watching through smart phones was not provided smoothly occurred.

As a demand for real-time live broadcasting service through mobile terminals increases, a mobile communication provider needs to develop a supplementary service corresponding to this, and needs a scheme of effectively managing mobile traffic. According to this, an evolved multimedia broadcast multicast service (eMBMS) technology has been proposed as a solution in a long term evolution (LTE) system. In the LTE system, the eMBMS technology utilizes an existing LTE frequency as it is and adopts a multicast transmission scheme to reduce traffic load and provide various new services such as an area-based advertisement, a contents business, and/or the like as well as a mobile broadcasting.

Meanwhile, in a unicast transmission scheme which is applied to an existing streaming video service, there is limitation on the number of concurrent access users since each user uses a data channel, so a smooth access becomes difficult if the number of users increases. On the other hand, in a broadcast transmission scheme, there is a need for a data channel per transferred contents, and there is no limitation on the number of concurrent users. So, the broadcast transmission scheme is capable of effectively managing traffic compared to the unicast transmission scheme.

However, in an existing communication system, contents for providing a service may be transmitted and received using one transmission scheme which is initially set when the service starts or an access is performed, so, if a transmission scheme is switched during transmitting and receiving contents, there is a need for stopping contents or reaccessing the service.

Specially, there is a problem that it is difficult for a communication system to detect the number of users within the same network to provide a seamless service between a unicast transmission scheme and a broadcast transmission scheme. Further, for switching between transmission schemes, there is a need for detecting the number of access users for each transmission scheme in real-time and performing switching between the transmission schemes, however, in a case of broadcast transmission in an existing technology, there is a problem that it is difficult to detect the number of access users in real-time to switch between heterogeneous access schemes while providing a seamless service.

The above information is presented as background information only to assist with an understanding of the present disclosure. No determination has been made, and no assertion is made, as to whether any of the above might be applicable as prior art with regard to the present disclosure.

DETAILED DESCRIPTION OF THE INVENTION

Technical Problem

An embodiment of the present disclosure proposes an apparatus and method for transmitting and receiving MRI information for managing traffic of a service in a communication system.

An embodiment of the present disclosure proposes an apparatus and method for transmitting and receiving MRI information based on a transmission type in a communication system.

An embodiment of the present disclosure proposes an apparatus and method for transmitting and receiving MRI information based on a transmission type which is suitable for the number of access users per service channel in a communication system.

Technical Solution

An embodiment of the present disclosure provides a method of transmitting information related to contents provision in a communication system. The method comprises acquiring content composition information and transmission scheme information of contents, generating media resource identification information including the transmission scheme information and schedule information per contents type based on the content composition information and the transmission scheme information, and transmitting the media resource identification information.

An embodiment of the present disclosure provides a method of receiving information related to contents provision in a communication system. The method comprises acquiring media resource identification information which is generated based on content composition information and transmission scheme information, and checking transmission scheme information of contents to be provided based on the media resource identification information, wherein the media resource identification information includes the transmission scheme information and schedule information per contents type.

An embodiment of the present disclosure provides an apparatus of transmitting information related to contents provision in a communication system. The apparatus comprises a transceiver configured to transmit and receive data, and a controller configured to control to acquire content composition information and transmission scheme information of contents, to generate media resource identification information including the transmission scheme information and schedule information per contents type based on the content composition information and the transmission scheme information, and to transmit the media resource identification information.

An embodiment of the present disclosure provides an apparatus of receiving information related to contents provision in a communication system. The apparatus comprises a transceiver configured to transmit and receive data, and a controller configured to acquire media resource identification information which is generated based on content composition information and transmission scheme information, and to check transmission scheme information of contents to be provided based on the media resource identification information, wherein the media resource identification information includes the transmission scheme information and schedule information per contents type.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Advantageous Effects

An embodiment of the present disclosure enables to manage traffic of a service in a communication system.

An embodiment of the present disclosure enables to manage traffic using MRI information which is generated based on a transmission type in a communication system.

An embodiment of the present disclosure enables to manage traffic using MRI information which is generated based on a transmission type suitable for the number of access users per service channel in a communication system.

An embodiment of the present disclosure enables a service provider to effectively manage traffic through a transmission scheme of a unicast or broadcast scheme which is suitable for each access environment based on the number of practical access users per service channel if a streaming video is served in a communication system.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TVT™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a client may be, for example, an electric device.

An apparatus and method proposed in an embodiment of the present disclosure may be applied to various communication systems such as a digital video broadcasting system such as a mobile broadcasting service such as a digital multimedia broadcasting (DMB) service, a digital video broadcasting-handheld (DVB-H) service, an advanced television systems committee-mobile/handheld (ATSC-M/H) service, and the like, and an internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, a mobile internet protocol (Mobile IP) system, and/or the like.

Hereinafter, a structure of a communication system to which an embodiment of the present disclosure is applied will be schematically described with reference to FIG. 1.

Figure 1:
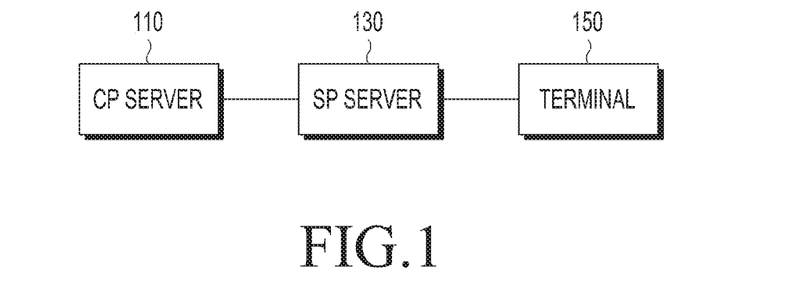
FIG. 1 schematically illustrates a structure of a communication system to which an embodiment of the present disclosure is applied.

FIG. 1 schematically illustrates a structure of a communication system to which an embodiment of the present disclosure is applied.

Referring to FIG. 1, a communication system to which an embodiment of the present disclosure is applied includes a contents provider (CP) server 110, a service provider (SP) server 130, and a terminal 150.

The CP server 110 is a server managed by a provider which provides contents, and transmits content composition information to the SP server 130. At this time, the content composition information may include at least one of contents information (e.g., an electronic service guide (ESG)), moving picture experts group (MPEG)-composition information (CI) which provides information about time relation and spatial relation between media components, and schedule information about schedule time per contents. The content composition information may be transmitted from the CP server 110 to the SP server 130 by request of the SP server 130 or by a predetermined period.

The SP server 130 receives the content composition information from the CP server 110, and generates MRI information based on the content composition information and information about a service access scheme which an SP provides to transmit the MRI information to the terminal 150. Here, an operation of generating the MRI information may be performed by an MRI entity (not shown) within the SP server 130. Here, the MRI information may be composed as a media resource identification table (MRIT).

It will be noted that the MRI entity within the SP server 130 may be a function, or be a software block or a hardware block, and a form of the MRI entity within the SP server 130 is not limited.

Specially, the MRI information generated in the MRI entity within the SP server 130 is transmitted to the terminal 150 as a table including contents information provided by the CP server 110, a uniform resource identifier (URI) of MPEG-CI media components, a transmission type which the SP server 130 determines by checking the number of practical access users per service channel, and/or the like.

The terminal 150 is an electric device which may be used by a user such as a client or a user equipment. The terminal 150 receives the MRI information from the SP server 130, and transmits, to the SP server 130, a response message to the MRI information.

If the terminal 150 does not receive normally the MRI information from the SP server 130, the terminal 150 may receive the content composition information from the CP server 110, and directly generate MRI information to transmit the MRI information to the SP server 130.

In detail, a method for generating and transmitting MRI information in the SP server 130 and a method for generating and transmitting MRI information in the terminal 150 will be described below.

Firstly, if an MRI entity which generates and transmits MRI information is included in the SP server 130, the SP server 130 receives, from the CP server 110, at least one of contents information, MPEG-CI, and schedule information which are generated when a CP generates contents or serves the contents. The SP server 130 generates an MRIT by adding a transmission scheme information (e.g., a transmission type) of contents according to a network situation of an SP to the content composition information received from the CP server 150. The SP server 130 caches and stores the generated MRIT, and may transmit the MRIT to the terminal 150 through a push message if an MRIT is requested or by a determined time period.

The terminal 150 may transmit a update check request message to the SP server 130 upon accessing the SP server 130 before a transmission period by which an MRIT is transmitted or upon performing an initial access. According to this, the terminal 150 receives a update check response message from the SP server 130 to check whether the MRIT is updated, and may receive the MRIT from the SP server 130 if necessary. The terminal 150 may acquire schedule information and a location of contents which a service access user wants through the received MRIT, and uses the service based on this. At this time, the terminal 150 caches the MRIT received from the SP server 130 using an inner entity, and requests update for the MRIT based on the cached MRIT or may receive the MRIT if necessary. Here, an MRI entity included in the terminal 150 knows access information such as an internet protocol (IP) address of an MRI of the SP server 130, and/or the like in advance.

Next, if an MRI entity which generates and transmits MRI information is included in the terminal 150, the terminal 150 receives, from the CP server 110, at least one of contents information, MPEG-CI, and schedule information which are generated when a CP generates contents or serves the contents, and receives transmission scheme information of contents according to a network situation of an SP from the SP server 130. At this time, unlike the MRI entity included in the SP server 130, if content composition information is transmitted through different transmission paths (e.g., a Wifi/ground wave, and/or the like), the terminal 150 may generate an MRIT based on content composition information and transmission scheme information of contents received through different paths. At this time, the MRI entity included in the terminal 150 periodically accesses the SP server 130 or the CP server 110 to request updated information and directly receives this.

Hereinafter, a detailed operating process for a method of generating and transmitting MRI information in an MRI entity included in the SP server 130 will be described with reference to FIG. 2.

Figure 2:
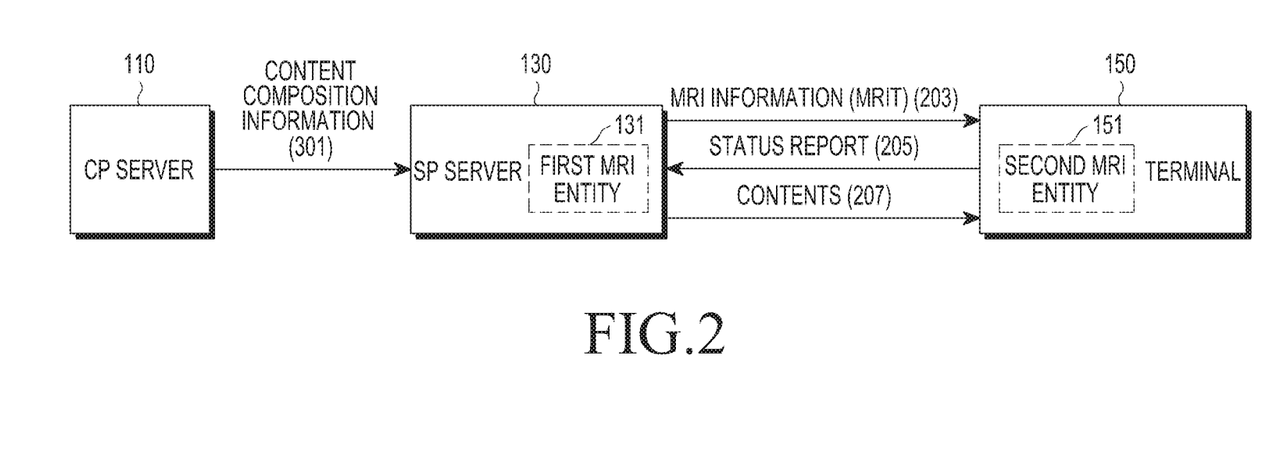
FIG. 2 schematically illustrates a structure of generating and transmitting MRI information in an SP server in a communication system according to an embodiment of the present disclosure.

FIG. 2 schematically illustrates a structure of generating and transmitting MRI information in an SP server 130 in a communication system according to an embodiment of the present disclosure.

Referring to FIG. 2, the first MRI entity 131 included in the SP server 130 receives content composition information from a CP server 110 (201). Here, the content composition information includes at least one of an ESG, MPEG-CI, URI, and schedule information. The first MRI entity 131 generates MRI information as an MRIT based on the received content composition information and transmission scheme information (e.g., a transmission type) of contents according to a network situation of the SP server 130 to generate the MRIT to the terminal 150 (203). At this time, if the first MRI entity 131 periodically receives content composition information or transmission scheme information of contents from the CP server 110 or the SP server 130, or receives update request from the terminal 150, the first MRI entity 131 may update the generated MRIT to transmit the updated MRIT to the terminal 150.

Through this, the terminal 150 may rapidly access a service which a service access user wants through an MRIT received already through background or through a request and response process for the MRIT with the first MRI entity 131. According that the terminal 150 receives the generated MRIT from the SP server 130, there is an effect that initial access time decreases compared to an existing service in which a plurality of request and response processes are required for accessing a desired service, so fast service access becomes possible.

As described above, the MRIT generated in the first MRI entity 131 is transmitted to the second MRI entity 151 (e.g., a stub MRI entity) included in the terminal 150. The second MRI entity 151 caches the received MRIT and uses the received MRIT for accessing a service which a user wants. The second MRI entity 151 transmits a status report message to the SP server 130 periodically or aperiodically (205). Here, the status report message may include at least one of access channel information which a user is currently accessing and channel status information.

The SP server 130 determines to switch a transmission scheme (i.e., a unicast transmission scheme or a broadcast transmissions scheme) based on channel related information included in the status report message. The SP server 130 transmits contents to the terminal 150 using the determined transmission scheme of the contents (207).

For example, if the first MRI entity 131 generates an MRIT for a service A as shown in Table 1, the first MRI entity 131 may transmit the MRIT as shown in Table 1 to the terminal 150. The terminal 150 may receive a service as the following based on a received MRIT.

If a user 1 access a service A at 05: 10 PM, the user 1 may know that the user 1 may receive a video of the service A through a multicast channel and receive audio of the service A through a unicast channel.

If a user 2 uses the same service channel at 06: 20 PM, the user 2 may use the service through a multicast channel in both a video and audio.

If the user 1 continues to access a channel of the service A, the user 1 may also use the service through a multicast channel in both a video and audio after 06: 00 PM. If all of the two users continue to watch the same service after 06: 30 PM, the two users may know that the two users may use additional text information through a unicast channel through an MRIT in Table 1.

TABLE 1

| Service | Contents Type | Transmission Type | Schedule Time |
|---------|---------------|-------------------|---------------|
| A | Mp4v | Multicast | 5 pm~7 pm |
| A | Mp4a | Unicast | 5 pm~6 pm |
| A | Mp4a | Multicast | 6 pm~7 pm |
| A | TXT | Unicast | 6:30 pm~7 pm |

Table 1 shows an example of an MRIT, and shows an example of contents schedule composition per service type (component).

Information included in the contents schedule composition may provide a transmission scheme and schedule information of contents from time at which the CP server 110 initially provides the contents, and the SP server 130 may determine a transmission scheme for contents which the SP server 130 provides according to a network situation. That is, the first MRI entity 131 may update an MRIT based on the content composition information provided by the CP server 110 and the transmission scheme for the contents which the SP server 130 determines based on a network situation or the number of service access users to provide the terminal 150 with the updated MRIT.

Hereinafter, a detailed operating process for a method of generating and transmitting MRI information in an MRI entity included in the terminal 150 will be described with reference to FIG. 3.

Figure 3:
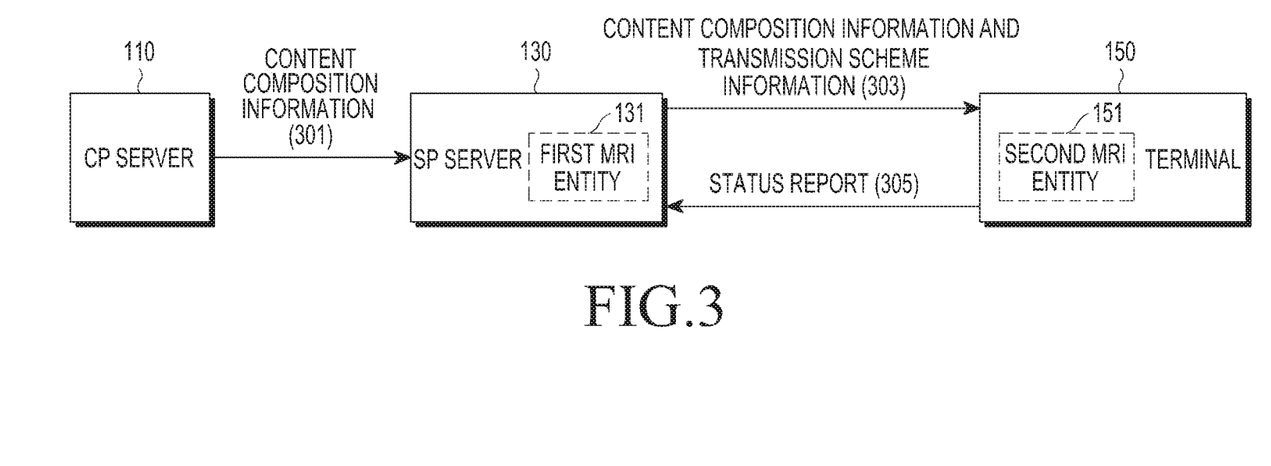
FIG. 3 schematically illustrates a structure of generating and transmitting MRI information in a terminal in a communication system according to an embodiment of the present disclosure.

FIG. 3 schematically illustrates a structure of generating and transmitting MRI information in a terminal 150 in a communication system according to an embodiment of the present disclosure. Here, the terminal 150 may generate MRI information in at least one of a case that the terminal 150 does not receive the MRI information even though the terminal requests the MRI information from the SP server 130, a case that the terminal 150 does not receive the MRI information at predetermined period, and a case that the terminal 150 receives content composition information and transmission scheme information of contents from the SP server 130.

Referring to FIG. 3, the SP server 130 receives content composition information from the CP server 110 (301), and transmits the received content composition information and transmission scheme information of contents according to a network situation to the second MRI entity 151 included in the terminal 150 (303).

For example, as shown in Table 1, when a service access user accesses a service, the second MRI entity 151 requests content information such as contents information (e.g., an ESG), MPEG-CI, URI, and/or the like which the CP server 110 generates when a CP generates or transmits contents and concurrently requests transmission scheme information of the contents from the SP server 130.

At this time, if it is possible to acquire the content composition information through the SP server 130, all of the content composition information and the transmission scheme information of the contents may be requested from the SP server 130. So, as shown in FIG. 3, the terminal 150 may receive the content composition information and the transmission scheme information of the contents from the SP server 130 at once. Meanwhile, if the content composition information and the transmission scheme information of the contents are transmitted through different paths, respectively, for example, if it is required to directly receive the content composition information from the CP server 110 through a broadcasting network or a Wifi, the content composition information and the transmission scheme information of the contents are requested from the CP server 110 and the SP server 130, respectively.

The second MRI entity 151 included in the terminal 150 generates MRI information based on the received content composition information and the transmission scheme information of the contents, and uses the generated MRI information upon accessing a service. At this time, the MRI information may be configured as an MRIT. The second MRI entity 151 transmits a status report message including channel related information to the SP server 130 (305). The SP server 130 may perform effective network management for an SP or switch a transmission scheme of contents based on the received status report message.

The MRI information as described above may be generated and transmitted with various methods according to an embodiment, and an example of an operation of switching a transmission scheme of contents using MRI information generated according to an embodiment of the present disclosure will be described with reference to FIG. 4.

Figure 4:
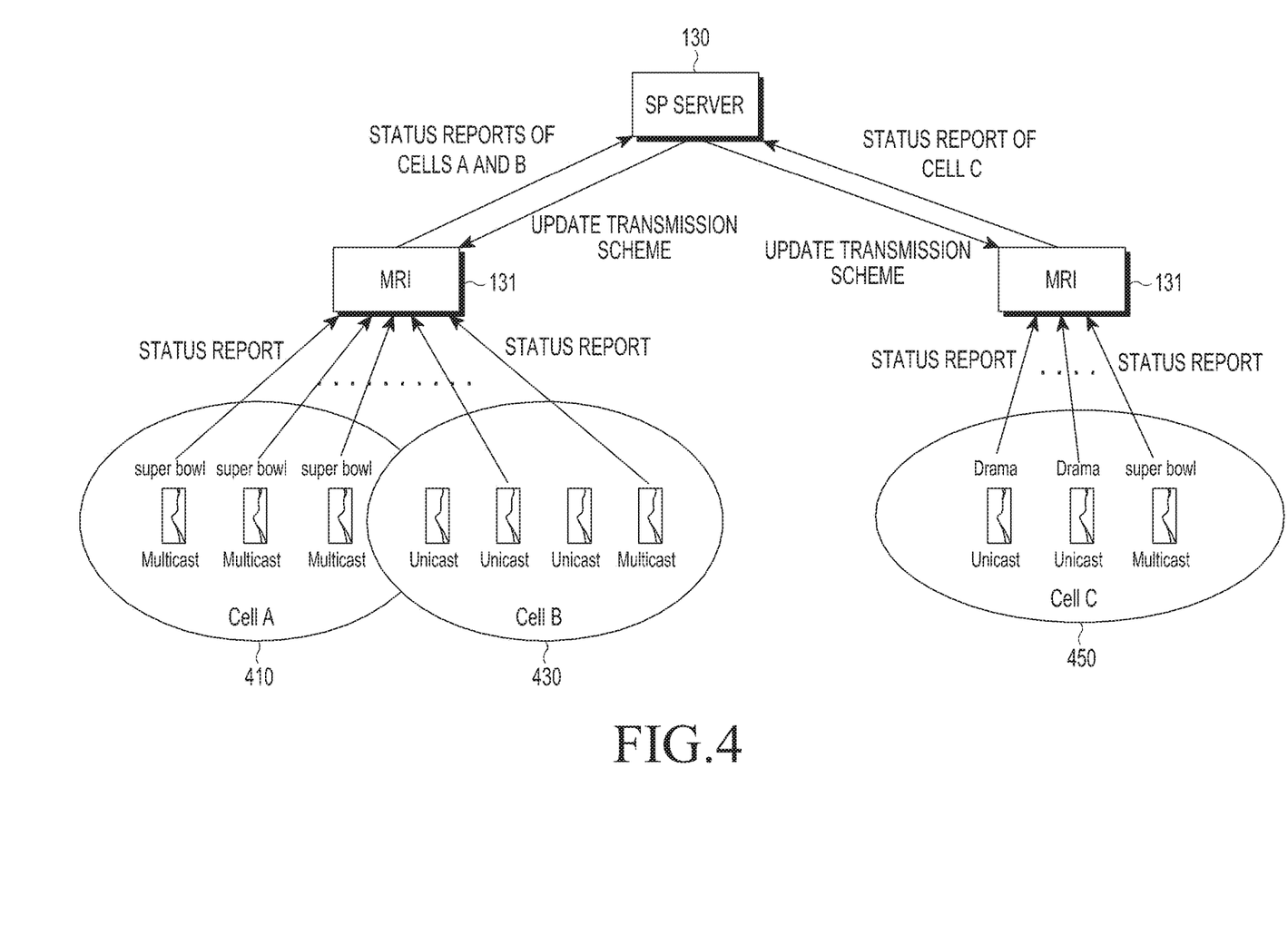
FIG. 4 illustrates an example of an operation in a case of switching a transmission scheme for contents based on information of a service access user of each cell in an MRI entity according to an embodiment of the present disclosure.

FIG. 4 illustrates an example of an operation in a case of switching a transmission scheme of contents based on information of a service access user of each cell in an MRI entity according to an embodiment of the present disclosure. In an example as shown in FIG. 4, it will be assumed that an MRI entity is the first MRI entity 131 included in an SP server 130. However, the second MRI entity 151 included in a terminal 150 may perform the same operation as the first MRI entity 131 as described in FIG. 4.

Referring to FIG. 4, for example, a super bowl game is scheduled to be started at 06:00 PM in a cell A 410, and MRI information about this is transmitted from the first MRI entity 131 to a terminal 150. That is, the first MRI entity 131 generates an MRIT based on content composition information of a CP and transmission scheme information of contents of an SP to transmit the MRIT to the terminal 150.

The terminal 150 determines that the super bowl game will provide a service with a unicast transmission scheme from 06:00 PM based on the received MRIT, and may use the corresponding service.

However, if many service access users are concentrated to use the corresponding service, the first MRI entity 131 transfers, to the SP server 130, at least one of channel status and service status of users in the cell A based on a status report message of each user equipment which is periodically transferred.

Then, the SP server 130 checks a network situation of the cell A based on at least one of the received channel status and service status of the users, and determines to switch from the unicast transmission scheme to a multicast transmission scheme for the super bowl game service for effective network management. The SP server 130 transfers information about a switched or updated transmission scheme to the first MRI entity 131. The first MRI entity 131 updates an MRIT based on the information about the switched or updated transmission scheme, and transfers the updated MRIT to terminals through a push message. Each of the terminals which receive the updated MRIT determines that it is possible to receive the service of the super bowl game service after switching from a unicast channel to a multicast channel based on MRI information which composes the updated MRIT and access the multicast channel to use the service.

In a cell B, if a drama service is provided through a multicast channel because there are many users of the drama service at 05:30 PM, and the number of users of a super bowl game service becomes great after 06:00 PM like the cell A, the SP server 130 may determine to switch a transmission scheme of contents for providing the drama service in the cell B from a multicast scheme to a unicast scheme and to switch a transmission scheme of contents for providing the super bowl game from a unicast scheme to a multicast scheme. The first MRI entity 131 updates information about this transmission scheme of contents and information about a corresponding schedule to transfer updated MRI information to terminals in a cell thereby providing smooth service use of service access users.

As described above, one MRI entity may transfer MRI information to terminals within one or more cells, and collect watching channel information, and/or the like of a service access user of each cell at the same time. Further, channel status or service watching status of terminals within each cell is reported to one MRI entity, and the one MRI entity transfers these to an SP server to assist in smoothly switching a transmission scheme of contents and effectively managing a network in each cell.

An example of a method of using and updating MRI information generated in an MRI entity has been described above, and a method of transmitting and receiving MRI information will be described with reference to FIGS. 5 and 6.

Figure 5:
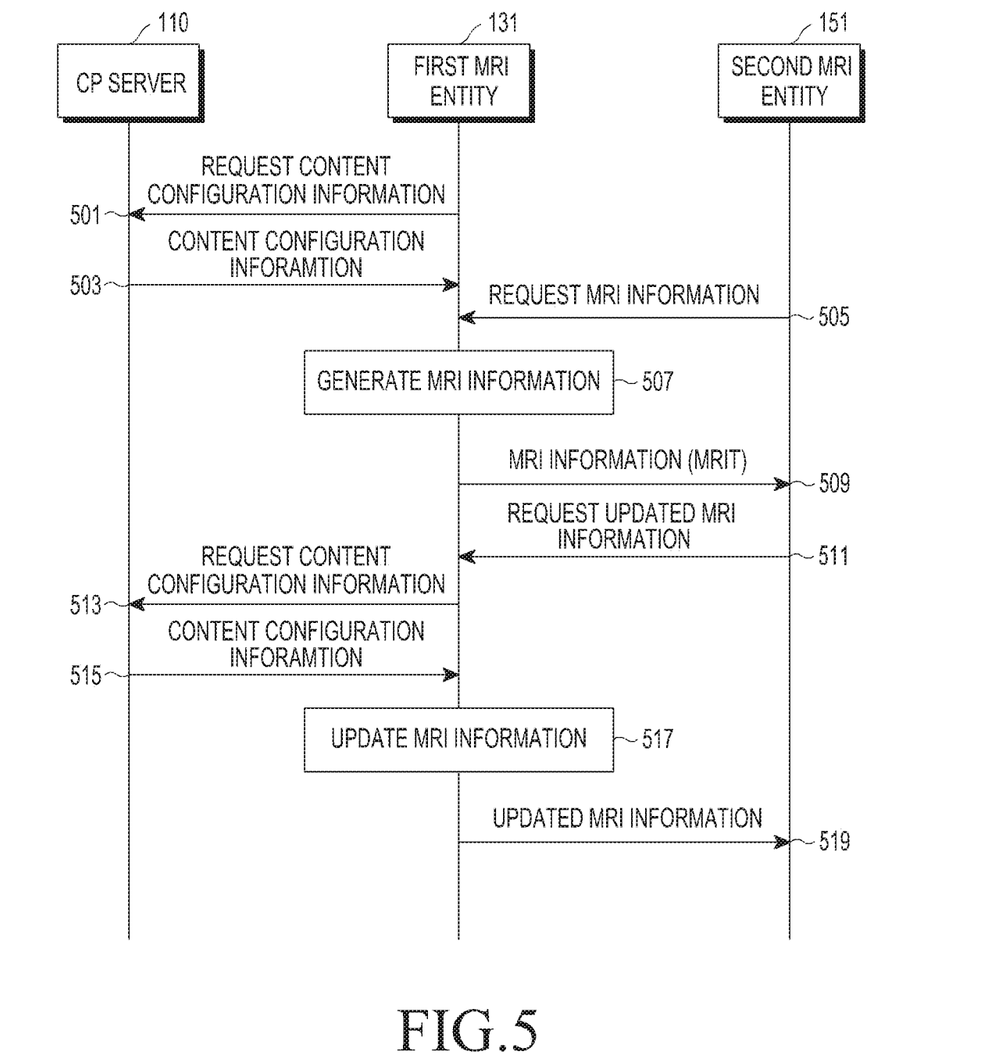
FIG. 5 illustrates a method of transmitting MRI information in the first MRI entity included in an SP server according to an embodiment of the present disclosure.

FIG. 5 illustrates a method of transmitting MRI information in the first MRI entity 131 included in an SP server 130 according to an embodiment of the present disclosure. That is, FIG. 5 shows a process in which the first MRI entity 131 generates and transmits MRI information if the first MRI entity 131 is located within the SP server 130, and the second MRI entity 151 included in a terminal 150 receives and updates the MRI information.

Referring to FIG. 5, the first MRI entity 131 requests content composition information from a CP server 110 (501), and receives the content composition information from the CP server 110 (503). At this time, the first MRI entity 131 may receive the content composition information from the CP server 110 by a predetermined period even though the first MRI entity 131 does not perform a process of requesting the content composition information from the CP server 110.

If the terminal 150 accesses a media service, the second MRI entity 151 included in the terminal 150 transmits an MRI information request message to the first MRI entity 131 using an address of the first MRI entity 131 (505) which the second MRI entity 151 has known already. At this time, if the second MRI entity 151 caches an MRIT which MRI information has composed already, the second MRI entity 151 transmits a message for checking whether an existing MRIT is updated.

Upon receiving the MRI information request message from the second MRI entity 151, the first MRI entity 131 generates MRI information based on the content composition information received from the CP server 110 and transmission scheme information of contents according to a network situation (507). The first MRI entity 131 transmits an MRIT which the generated MRI information composes to the second MRI entity 151 (509). So, the second MRI entity 151 within the terminal 150 may cache the MRIT received from the first MRI entity 131 and provide a service access user with the MRIT. So, the service access user may access a desired service using the provided MRIT.

Here, the second MRI entity 151 may update an MRIT to be used in the terminal 150 with a method in which the second MRI entity 151 checks MRIT update at regular intervals, e.g., every 10 minutes, or the first MRI entity 131 pushes a updated MRIT by force. That is, the second MRI entity 151 transmits periodically a updated MRI information request message to the first MRI entity 131 (511). So, the first MRI entity 131 requests content composition information from the CP server 110 (513) to receive the content composition information (515). At this time, the first MRI entity 131 may use content composition information which is periodically received without performing an operation of requesting the content composition information from the CP server 110. The first MRI entity 131 updates an MRIT based on the content composition information of the CP server 110 (517). The first MRI entity 131 checks MRIT version information of an existing MRIT and a generated MRIT, and transmits a updated MRIT to the second MRI entity 151 if the MRIT is updated (519). Meanwhile, the first MRI entity 131 may push a updated MRIT to the second MRI entity 151 by a determined period without receiving the updated MRI information request message from the second MRI entity 151. For example, if a transmission scheme of contents is switched according to a situation of a user access network or the number of service users, the SP server 130 may transmit updated transmission scheme information to the first MRI entity 131. So, the first MRI entity 131 updates an MRIT based on the updated transmission scheme information to push the updated MRIT to the terminal 150 thereby updating an MRIT cached in the second MRI entity. From this, a service access user may use a seamless service using the MRIT provided by the terminal 150 in an environment that a transmission scheme of contents is switched according to a fast service channel access and a network service access provider.

Figure 6:
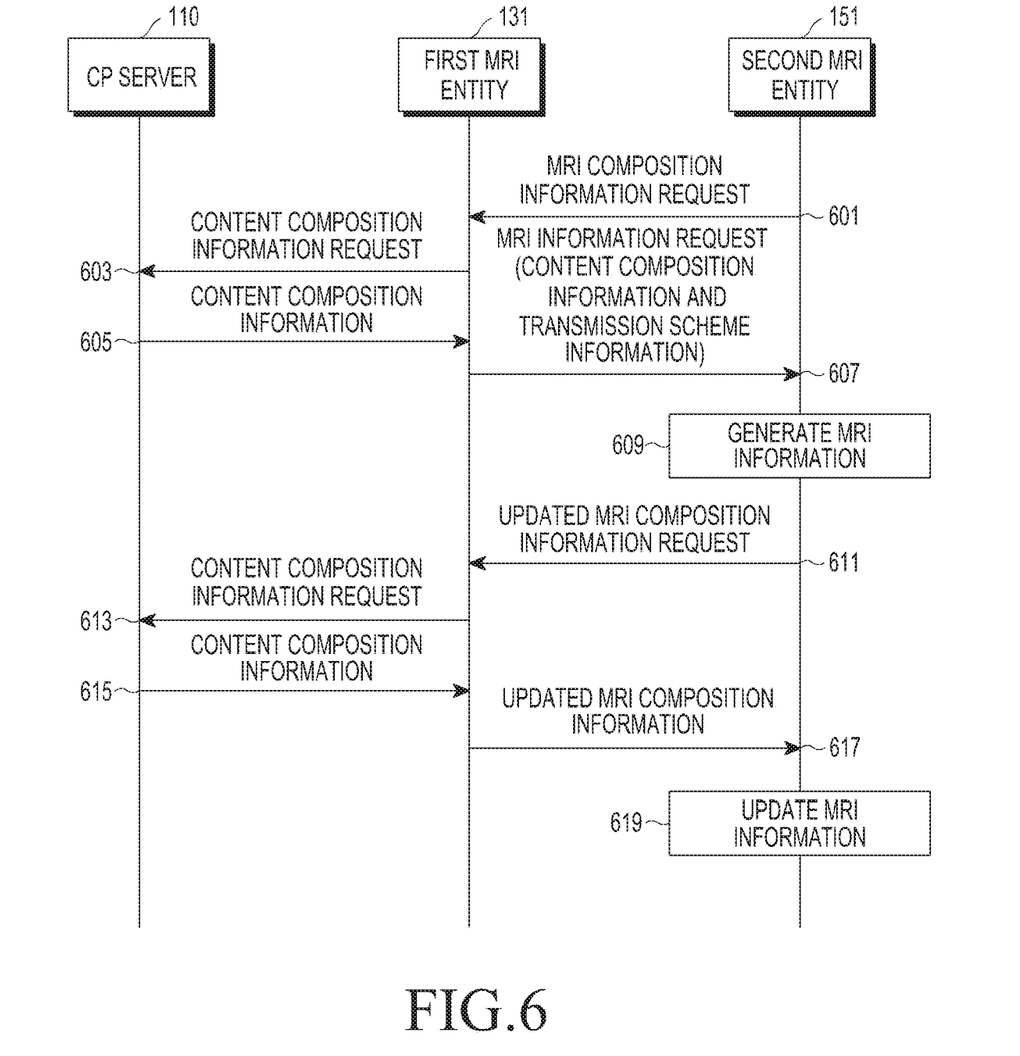
FIG. 6 illustrates a method of transmitting MRI information in the second MRI entity 151 included in a terminal 150 according to an embodiment of the present disclosure.

FIG. 6 illustrates a method of transmitting MRI information in the second MRI entity 151 included in a terminal 150 according to an embodiment of the present disclosure. That is, FIG. 6 illustrates a process of generating and updating MRI information in the second MRI entity 151 in a case that the second MRI entity 151 is within the terminal 150. Here, the second MRI entity 151 may perform the following operation in at least one of a case that the second MRI entity 151 does not receive MRI information even though the second MRI entity 151 requests the MRI information from an SP server 130, a case that the second MRI entity 151 does not receive the MRI information at predetermined period, and a case that the second MRI entity 151 receives content composition information and transmission scheme information of contents from the SP server 130.

Referring to FIG. 6, the second MRI entity 151 transmits a request message for requesting MRI composition information for generating MRI information to the first MRI entity 131 using an address of the first MRI entity 131 which the second MRI entity 151 has known already (601). The first MRI entity 131 requests content composition information from a CP server 110 (603), and receives the content composition information from the CP server 110 (605). At this time, the first MRI entity 131 may receive the content composition information from the CP server 110 by a determined period without performing a process of requesting the content composition information from the CP server 110.

The first MRI entity 131 transmits, to the second MRI entity 151, MRI composition information including the content composition information of the CP server 110 and transmission scheme information of contents according to a network situation. Here, the first MRI entity 131 may transmit the MRI composition information to the second MRI entity by a determined period without receiving the request message for requesting the MRI composition information from the second MRI entity 151.

The second MRI entity 151 generates an MRIT which MRI information composes based on content composition information received from the first MRI entity 131 and transmission scheme information of contents (609).

Here, the second MRI entity 151 may update an MRIT by transmitting, to the first MRI entity 131, a request message for requesting updated MRI composition information for updating the MRIT at regular intervals, e.g., every 10 minutes, or periodically receiving updated MRI composition information from the first MRI entity 131. In detail, the second MRI entity 151 transmits a request message for requesting updated MRI composition information for updating an MRIT to the first MRI entity 131 (611). The first MRI entity 131 requests content composition information from the CP server 110 (613), and receives the content composition information from the CP server 110 (615). At this time, the first MRI entity 131 may receive the content composition information from the CP server 110 by a determined period without performing a process of requesting the content composition information from the CP server 110.

If current MRI composition information is updated compared to MRI composition information transmitted to the second MRI entity 151 previously, the first MRI entity 131 transmits the updated MRI composition information to the second MRI entity 151 (617). At this time, if MRI composition information is updated, the first MRI entity 131 may push the updated MRI composition information to the second MRI entity 151 without receiving a request message for requesting the updated MRI composition information from the second MRI entity 151.

The second MRI entity 151 may update MRI information which composes an MRIT based on the updated MRI composition information received from the first MRI entity 131 to update the MRIT (619).

From this, a service access user may use a seamless service using the MRIT provided by the second MRI entity 151 included in the terminal 150 in an environment that a transmission scheme of contents is switched according to a fast service channel access and a network service access provider.

A method of transmitting and receiving MRI information in the first MRI entity 131 and the second MRI entity 151 has been described above, and a structure of an SP server 130 including the first MRI entity 131 and a structure of a terminal 150 including the second MRI entity 151 will be described with reference to FIGS. 7 and 8.

Figure 7:
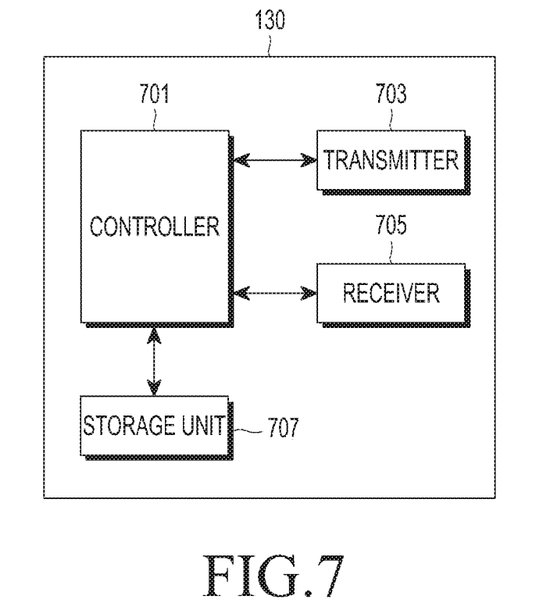
FIG. 7 illustrates a structure of an SP server 130 including the first MRI entity 131 in a communication system according to an embodiment of the present disclosure.

FIG. 7 illustrates a structure of an SP server 130 including the first MRI entity 131 in a communication system according to an embodiment of the present disclosure.

Referring to FIG. 7, an SP server 130 includes a controller 701, a transmitter 703, a receiver 705, and a storage unit 707. The controller 701 controls the overall operation of the SP server 130, and more particularly, controls an operation related to an operation of generating and transmitting MRI information in a communication system according to an embodiment of the present disclosure. Here, the operation related to the operation of generating and transmitting the MRI information in the communication system according to an embodiment of the present disclosure which the SP server 130 performs has been described with reference to FIGS. 1 to 6, and a detailed description thereof will be omitted herein.

The transmitter 703 transmits various signals and various messages to at least one other entity under a control of the controller 701. The various signals, the various messages, and/or the like transmitted by the transmitter 703 have been described in FIGS. 1 to 6, and a detailed description thereof will be omitted herein.

The receiver 705 receives various signals and various messages from at least one other entity under a control of the controller 701. The various signals, the various messages, and/or the like received by the receiver have been described in FIGS. 1 to 6, and a detailed description thereof will be omitted herein.

The storage unit 707 stores various programs and various data for the SP server 130 to perform an operation related to an operation of generating and transmitting MRI information in a communication system according to an embodiment of the present disclosure as described in FIGS. 1 to 6, and stores data occurred while the operation related to the operation of generating and transmitting the MRI information in the communication system according to an embodiment of the present disclosure as described in FIGS. 1 to 6 is performed.

Although the controller 701, the transmitter 703, the receiver 705, and the storage unit 707 are described as separate units in the SP server 130 in FIG. 7, it is to be understood that the SP server 130 may be implemented with a form into which at least two of the controller 701, the transmitter 703, the receiver 705, and the storage unit 707 are incorporated.

Figure 8:
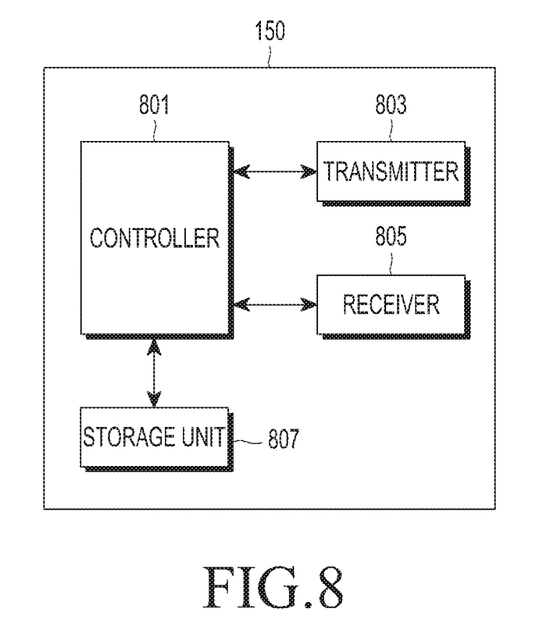
FIG. 8 illustrates a structure of a terminal 150 including the second MRI entity 151 in a communication system according to an embodiment of the present disclosure.

FIG. 8 illustrates a structure of a terminal 150 including the second MRI entity 151 in a communication system according to an embodiment of the present disclosure.

Referring to FIG. 8, a terminal 150 includes a controller 801, a transmitter 803, a receiver 805, and a storage unit 807. The controller 801 controls the overall operation of the terminal 150, and more particularly, controls an operation related to an operation of receiving or generating MRI information in a communication system according to an embodiment of the present disclosure. Here, the operation related to the operation of receiving or generating the MRI information in the communication system according to an embodiment of the present disclosure which the terminal 150 performs has been described with reference to FIGS. 1 to 6, and a detailed description thereof will be omitted herein.

The transmitter 803 transmits various signals and various messages to at least one other entity under a control of the controller 801. The various signals, the various messages, and/or the like transmitted by the transmitter 803 have been described in FIGS. 1 to 6, and a detailed description thereof will be omitted herein.

The receiver 805 receives various signals and various messages from at least one other entity under a control of the controller 801. The various signals, the various messages, and/or the like received by the receiver have been described in FIGS. 1 to 6, and a detailed description thereof will be omitted herein.

The storage unit 807 stores various programs and various data for the terminal 150 to perform an operation related to an operation of receiving or generating MRI information in a communication system according to an embodiment of the present disclosure as described in FIGS. 1 to 6, and stores data occurred while the operation related to the operation of receiving or generating the MRI information in the communication system according to an embodiment of the present disclosure as described in FIGS. 1 to 6 is performed.

Although the controller 801, the transmitter 803, the receiver 805, and the storage unit 807 are described as separate units in the terminal 150 in FIG. 8, it is to be understood that the terminal 150 may be implemented with a form into which at least two of the controller 801, the transmitter 803, the receiver 805, and the storage unit 807 are incorporated.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A service providing method according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

A service providing apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of transmitting information related to contents provision in a communication system, comprising:
    acquiring, by a service provider (SP) server, content composition information from a contents provider (CP) server and a transmission type for each service channel based on a number of access users per a service channel;
    generating, by the SP server, media resource identification (MRI) information based on the content composition information acquired from the CP server and transmission scheme information including the transmission type for each service channel;
    transmitting, by the SP server, the MRI information to at least one mobile terminal connected to each service channel;
    updating, by the SP server, the MRI information after a predetermined period, in response to receiving an updated MRI information request, or according to channel status information of each service channel;
    comparing, by the SP server, the updated MRI information with the transmitted MRI information; and
    when the updated MRI information and the transmitted MRI information are different, transmitting, by the SP server, the updated MRI information to the at least one mobile terminal,
    wherein the content composition information includes an electronic service guide (ESG), moving picture experts group (MPEG)-composition information (CI), uniform resource identifier (URI) of a plurality of contents and schedule information, and
    wherein the MRI information is composed as a table combining the ESG, the MPEG-CI, the URI, the schedule information and the transmission scheme information.

2. The method of claim 1, wherein the ESG includes contents information, the MPEG-CI includes information about time relation and spatial relation between the plurality of contents, and the schedule information includes information about schedule time for each of the plurality of contents.

3. The method of claim 1, wherein the transmission type indicates one of a unicast transmission scheme and a broadcast transmission scheme.

4. The method of claim 1, wherein the transmission type is acquired from the SP server.

5. A method of receiving information related to contents provision by a mobile terminal in a communication system, comprising:
    acquiring, by the mobile terminal, based on a number of access users per a service channel, media resource identification (MRI) information which is generated based on content composition information and transmission scheme information including a transmission type for each service channel;
    obtaining, by the mobile terminal, the transmission type for a target service channel providing a requested content based on the MRI information;
    accessing, by the mobile terminal, the requested content on the target service channel using the obtained transmission type and the content composition information included in the MRI information;

receiving, from a service provider (SP) server, updated content composition information after a predetermined period, in response to transmitting an updated MRI information request, or according to channel status information of each service channel; and generating, by the mobile terminal, updated MRI information based on the updated content composition information, wherein the content composition information includes an electronic service guide (ESG), moving picture experts group (MPEG)-composition information (CI), uniform resource identifier (URI) of a plurality of contents and schedule information, and wherein the MRI information is composed as a table combining the ESG, the MPEG-CI, the URI, the schedule information and the transmission scheme information.

6. The method of claim 5, wherein the ESG includes contents information, the MPEG-CI includes information about time relation and spatial relation between the plurality of contents, and the schedule information includes information about schedule time for each of the plurality of contents.

7. The method of claim 5, wherein the transmission type indicates one of a unicast transmission scheme and a broadcast transmission scheme.

8. The method of claim 5, wherein the transmission type is acquired from the SP server.

9. A service provider (SP) server for transmitting information related to contents provision in a communication system, comprising:
a transceiver configured to transmit and receive data; and
at least one processor of the SP server configured to:
acquire content composition information from a contents provider (CP) server and a transmission type for each service channel based on a number of access users per a service channel,
generate media resource identification (MRI) information based on the content composition information acquired from the CP server and transmission scheme information including the transmission type for each service channel,
transmit the MRI information to at least one mobile terminal connected to each service channel,
update the MRI information after a predetermined period, in response to receiving an updated MRI information request, or according to channel status information of each service channel,
compare the updated MRI information with the transmitted MRI information, and
when the updated MRI information and the transmitted MRI information are different, transmit the updated MRI information to the at least one mobile terminal,
wherein the content composition information includes an electronic service guide (ESG), moving picture experts group (MPEG)-composition information (CI), uniform resource identifier (URI) of a plurality of contents and schedule information, and wherein the MRI information is composed as a table combining the ESG, the MPEG-CI, the URI, the schedule information and the transmission scheme information.

10. The SP server of claim 9, wherein the ESG includes contents information, the MPEG-CI includes information about time relation and spatial relation between the plurality of contents, and the schedule information includes information about schedule time for each of the plurality of contents.

11. The SP server of claim 9, wherein the transmission type indicates one of a unicast transmission scheme and a broadcast transmission scheme.

12. The SP server of claim 9, wherein the transmission type is acquired from the SP server.

13. A mobile terminal for receiving information related to contents provision in a communication system, comprising:
a transceiver configured to transmit and receive data; and
at least one processor of the mobile terminal configured to:
acquire, based on a number of access users per a service channel, media resource identification (MRI) information which is generated based on content composition information and transmission scheme information including a transmission type for each service channel,
obtain the transmission-type for a target service channel providing a requested content based on the MRI information,
access the requested content on the target service channel using the obtained transmission type and the content composition information included in the MRI information,
receive, from a service provider (SP) server, updated content composition information after a predetermined period, in response to transmitting an updated MRI information request, or according to channel status information of each service channel, and
generate updated MRI information based on the updated content composition information,
wherein the content composition information includes an electronic service guide (ESG), moving picture experts group (MPEG)-composition information (CI), uniform resource identifier (URI) of a plurality of contents and schedule information, and
wherein the MRI information is composed as a table combining the ESG, the MPEG-CI, the URI, the schedule information and the transmission scheme information.

14. The mobile terminal of claim 13, wherein the ESG includes contents information, MPEG-CI includes information about time relation and spatial relation between the plurality of contents, and the schedule information includes information about schedule time for each of the plurality of contents.

15. The mobile terminal of claim 13, wherein the transmission type indicates one of a unicast transmission scheme and a broadcast transmission scheme.

16. The mobile terminal of claim 13, wherein the transmission type is acquired from the SP server.

* * * * *